United States Patent Office

3,573,238
Patented Mar. 30, 1971

3,573,238
STYRENE AND VEGETABLE OIL MODIFIED PHENOLIC RESIN AND METHOD OF PREPARING THE SAME
Donald Joseph Albrinck and Victor Asfour, Cincinnati, Ohio, assignors to Formica Corporation, Cincinnati, Ohio
No Drawing. Continuation-in-part of application Ser. No. 630,509, Apr. 13, 1967. This application Sept. 15, 1969, Ser. No. 858,185
Int. Cl. C08g 5/20
U.S. Cl. 260—19                    10 Claims

ABSTRACT OF THE DISCLOSURE

A modified phenolic resinous material in which a plurality of reactants are successively reacted with a phenol and with the subsequent reaction products produced in which said phenol is successively reacted with a polymerizable styrene monomer, the reaction product thereof reacted with a vegetable drying oil, the reaction product thereof reacted with either formaldehyde and then certain diphenolic compounds or vice-versa, or both simultaneously and, finally, with one or more of certain aniline compounds under defined conditions and in defined amounts; the process of preparing such a phenolic resinous material and to its use in making a laminate.

This application is a continuation in part of our earlier application Ser. No. 630,509, filed on Apr. 13, 1967, now abandoned, entitled Modified Phenolic Resinous Compositions Prepared by Reacting a Phenol in Succession With a Polymerizable Styrene Monomer, a Vegetable Drying Oil, Formaldehyde and One or More of Certain Diphenolic Compounds in Either Order and an Aniline Compound, the Process of Preparing the Same and Laminates Made From Said Resinous Compositions.

BACKGROUND OF THE INVENTION

Phenolic resins are well known in the art and have been manufactured commercially for a substantial plurality of years. These phenolic resins have been used for making molded articles and laminated articles. Many improvements in the phenolic resins have been made by modifying the basic phenolic resin concept with techniques in the manipulative steps of producing the phenolic resin or by incorporating therein modifying additives. Frequently external plasticizers, fillers and flame retardants are added to the system to improve properties. Cresylic-formaldehyde resins in both modified and unmodified form have been frequently used to produce punching grade industrial laminates where flame retardance is not a requirement.

THE FIELD OF THE INVENTION

The field of the present invention is in the modified phenol-formaldehyde resin art wherein a selected phenol is reacted with a polymerizable styrene monomer and the reaction product produced thereby is then reacted with a vegetable drying oil. The resulting reaction product is then further reacted with formaldehyde or a compound engendering formaldehyde and certain diphenolic compounds, such as diphenolic acid terminated polyamide compound or a diphenolic acid terminated polyester compound and, finally, with any one of certain aniline compounds.

DESCRIPTION OF THE PRIOR ART

The closest prior art of which the instant applicants are ware are the U.S. Pat. Nos. 2,907,728, 2,930,774, 3,007,827 and 3,228,899.

SUMMARY OF THE INVENTION

This invention relates to a thermosetting phenolformaldehyde resin which is prepared by reacting a phenol with a polymerizable styrene monomer under acidic conditions and then reacting said reaction product with a vegetable drying oil again under acidic conditions. The reaction product of the second step is then reacted with either a mixture of formaldehyde and a diphenolic acid terminated polyamide compound and/or a diphenolic acid terminated polyester compound in admixture with formaldehyde or any one of the three reactants may be used successively in any selected order, or the diphenolic acid terminated polyamide compound can be used to the exclusion of the diphenolic acid terminated polyester compound and vice versa. The reaction in the third step is carried out until a string test time of 125–225 sec. at 170° C. is achieved as defined in detail hereinbelow. Upon achieving the selected string time, the reaction product of step (3) is then reacted with an aniline compound, the product is cooled, substantially completely dehydrated, and then diluted with an organic solvent whereupon the resulting resinous material is then ready for use as a modified laminating resin.

In order that the concept of the present invention may be more completely understood, each of the reactants will be discussed in categories hereinbelow followed by discussion of the quantities of reactants used and the conditions of the reactions in each of the successive steps.

As a phenol, one may use phenol per se, or any of the substituted phenols, including the ortho-, meta-, para-cresols and xylenols. One may obviously use mixtures of phenols, including a mixture of alkyl substituted phenols. A commercially available mixture comprising the following isomer description is particularly desirable since it contains cresols plus xylenols and are collectively known as cresylics or cresylic acid:

TABLE I

| Isomer distribution: | Percent by weight |
|---|---|
| Phenol | 4.0–6.0 |
| o-Cresol | 1.0 max. |
| Meta, para-cresols | 19.0–21.0 |
| 2,4+2,5-xylenol | 18.0–22.0 |
| 2,3+3,5-xylenol | 37.0–44.0 |
| 3,4-xylenol | 8.0–12.0 |
| 2,6-xylenol | 0.5 max. |
| Trimethyl-substituted phenol | 7.0 max. |

These phenols, for the sake of simplicity, will sometimes be referred to hereinbelow as reactant A.

The second principal reactant used in the process of the present invention is a polymerizable styrene monomer. Included in the group of polymerizable styrene monomers which can be used in the process of the present invention are styrene per se, the ring-substituted alkyl and/or halo styrenes, such as ortho-, meta-, para-methyl styrenes, ortho-, meta-, para-ethyl styrenes, 2,4-dimethyl styrene 2,5-dimethyl styrene, ortho-, meta-, para-chloro styrenes, ortho-, meta-, para-bromo styrenes, 2,4-dichlorostyrene, 2,5-dibromostyrene, and the like. These styrenes can be used either singly or in combination with one another. One can additionally use the side chain substituted alkyl and halo styrenes, such as α-methyl styrene, α-chloro styrene, and the like. It is preferred to use either styrene per se or the ring-substituted styrenes since the side chain substituted styrenes may have a tendency under certain conditions to function as a chain terminator. For the sake of simplicity, these styrene compounds will sometimes be referred to hereinbelow as reactant B.

The third component used in the practice of the process of the present invention is a vegetable drying oil and is reacted with the reaction product of the phenol compound and the ploymerizable styrene monomer. Among the vegetable drying oils which may be used in the practice of the process of the present invention are: coconut oil, palm oil, safflower oil, tung oil, oiticica oil, linseed oil, dehydrated castor oil, soya oil, walnut oil, sunflower oil, cottonseed oil, corn oil, sesame oil, peanut oil, grapeseed oil, mustard seed oil, and the like. These oils may be used singly or in combination with one another, but it is preferred to make use of the tung oil. The vegetable drying oils will be referred to sometimes hereinbelow as reactant C.

The fourth component used in the practice of the process of the present invention is formaldehyde and compounds engendering formaldehyde, such as paraformaldehyde, hexamethylene-tetramine, and the like. These formaldehyde compounds will be referred to hereinbelow for the sake of simplicity as reactant D.

The fifth reactant is a diphenolic acid compound selected from the group consisting of those having the structural formulae:

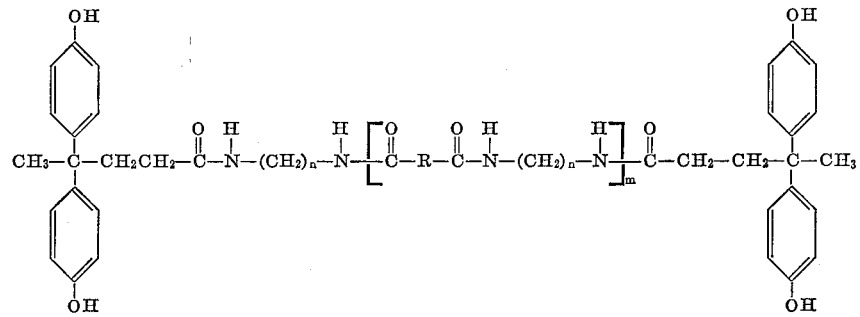
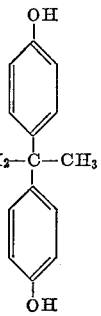

and

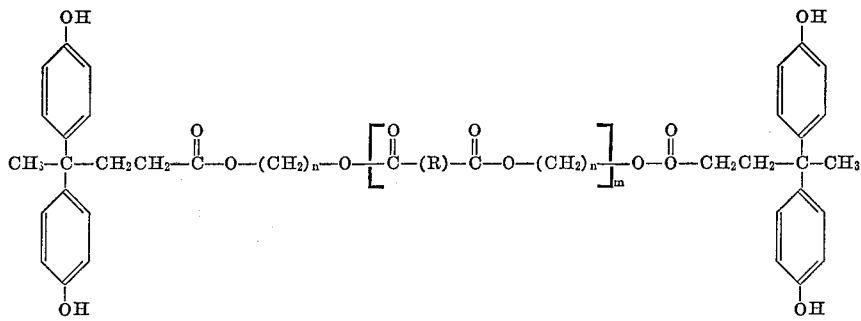
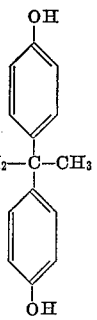

wherein, in each of these structural formulae, R is a moiety of an aliphatic dicarboxylic acid having between 2 and 44 carbon atoms, wherein $n$ is a whole positive integer between 2 and 5, inclusive and wherein $m$ is a whole positive integer between 2 and 10, inclusive.

The diphenolic acid terminated polyamide compounds are prepared by reacting between 2 and 10 moles of an aliphatic dicarboxylic acid with 3 to 11 moles of an alkylene diamine, which reaction product is then reacted with 2 moles of 4,4'-bis-(4-hydroxyphenyl)-pentanoic acid, sometimes referred to simply as pentanoic acid for the sake of simplicity. The pentanoic acid reacts with the terminal amine groups in the compound resulting from the reaction of the dimer acid with the alkylene diamine and thereby terminates the molecule at each extremity wih an amide linkage. Among the aliphatic dicarboxylic acids which may be reacted with the alkylene diamines are oxalic, malonic, succinic, glutaric, adipic, pimelic, sebacic, azelaic, suberic, brassic, brassylic, roccellic, and the like. Still further and as a preferred embodiment, dimer acids may be used such as the dimers of linolenic or linoleic, myristoleic, palmitoleic, oleic, elaeostearic, ricinoleic, licanic, erucic, and $C_{20}$–$C_{22}$ unsaturated monocarboxylic acids. Among the alkylene diamines which may be used to react with the dimer of the unsaturated fatty acids are ethylene diamine, propylene diamine-1,3, butylene diamine-1,4 and amylene diamine-1,5. It is preferred to use the ethylene diamine with either the dimer of linoleic acid or the dimer of linolenic acid. This diphenolic acid terminated polyamide compound is sometimes referred to hereinbelow as "DPAPA" for the sake of simplicity and sometimes hereinbelow as reactant E for the sake of brevity.

The diphenolic acid terminated polyester compound is analogously prepared by reacting an alphatic dicarboxylic acid, such as those listed above in the "DPAPA" compounds including dimer acids in an amount of between 2 and 10 moles of dicarboxylic acid with between 3 and 11 moles of an alkane diol having from 2 to 5 carbon atoms, such as ethylene glycol, propane diol-1,3, butane diol-1,4 and pentane diol-1,5. As in the instance of the DPAPA when the dicarboxylic acid in the selected amount is reacted with the dihydric alcohol, the resultant reaction product is then reacted with 2 moles of 4,4'-bis-(4-hydroxyphenyl)pentanoic acid. The resulting alcoholic hydroxy groups terminating the reaction product of the aliphatic dicarboxylic acid and the diol are then reacted with the pentanoic acid and form terminal ester groups. For the sake of simplicity, this reaction product will be referred to hereinbelow sometimes as "DPAPE," and for the sake of brevity, as reactant F.

The sixth essential reactant used in the practice of the process of the present invention is an aniline compound and, more particularly, an aniline compound having at least one amino group, having at least one aldehyde reactable hydrogen atom directly attached to the nitrogen atom of said amino group. Included in the group would be the aniline compounds that are basic in character which have a primary amino group and/or a secondary amino group but excluded are the tertiary amino groups such as N,N-dimethyl aniline per se. Among the specific compounds which may be used as the sixth essential reactant in the practice of the process of the present invention is aniline per se, ditolyl diamine, acetyl anilines, allyl aniline, N-benzoyl aniline, p-amino benzanilide, N-methyl aniline, pentachloro aniline, o, m and p-bromoanilines, o, m and p-chloroanalines, o, m and p-iodoanilines, o, m and p-fluoroanilines, 2,4-dichloroanilines, 3,4-dichloroanilines, 3,5-dichloroanilines, o, m and p-hydroxyanilines (amino phenols), o, m and p-aminoanilines (phenylenediamines), o, m and p-methylanilines (toluidines), 2-amino-3-methylanilines (2,4-diaminotoluene), 4,4'-diaminodiphenylmethane, 4,4'-diaminodiphenylsulfone, 2,4-diaminodiphenylamine (or, N'-phenyl-1,2,4-benzenetriamine), 4,4′diaminobiphenyl (benzidine), p-aminoacetanilide, 4 - aminoacetophenone, 3 - aminoacetophenone, N,N′-diethyl-p-phenylenediamine, N,N′-dimethyl-p-phenylenediamine, p-(methylthio) aniline, 3-amino-p-anisanilide, 4-aminodiphenylamine (N-phenyl - p - phenylenediamine), 4,4′-diaminodiphenylsulfide (thioaniline), m-aminodiphenylmethane, p-aminodiphenylmethane, 2,4-xylidine, 2,5-xylidine, and the like. These aniline compounds may be used either singly or in combination with one another. For the sake of simplicity, these aniline compounds will sometimes be referred to hereinbelow as reactant G.

Now, the various steps, amounts of reactants, and conditions of the individual steps will be discussed hereinbelow.

In step (1), 100 parts of reactant A are reacted with from about 5 to about 60 parts and, preferably, 10 to about 30 parts of reactant B under acidic conditions at a temperature between about 25° C. and 110° C. When this reaction is completed, the product AB is then reacted with about 10 to 75 parts and, preferably, 30 to about 50 parts of a vegetable drying oil under acidic conditions at a temperature between about 130° C. and 180° C. The reaction product ABC is then cooled to a temperature below about 120° C. and the pH is adjusted upwardly to between about 6 and 7.5 while adding to the reaction mass from about 15 to about 50 parts and, preferably, 20 to about 35 parts of formaldehyde and from 10 to 60 parts of either or both and, preferably, 15 to about 30 parts of the diphenolic compounds referred to hereinabove in any selected order of addition or simultaneously, if desired. The mixture of the reaction product ABC is then reacted with reactant D and reactant E and/or reactant F at a temperature between about 70° C. and 120° C. to a string time of 125–225 sec. at 170° C. It is considered appropriate at this time to define the string time test.

The string time test is accomplished by adjusting a steam-heated plate to a temperature of 170° C. using 80 p.s.i. wherein the temperature is determined by use of a thermo-couple or surface thermometer. Using a medicine dropper, a sample of about 1–2 cc. of resin is deposited on the surface of the heated plate, noting the time at which the sample was first deposited on the plate by starting a stop-watch. The sample is allowed to set on the plate for about 10 seconds before starting to stroke or pat the sample. Thereupon, the entire sample is stroked using a spatula in order to facilitate the stoppage of the fuming and bubbling. As the bubbling subsides, the stroking or patting is limited to only one area approximately the width of a ½″ spatula blade. The sample is stroked or patted with a spatula at the rate of 1–2 strokes per second. As the curing proceeds, this stroking action will result in filaments of resins being trailed from the spatula. At the first moment that these filaments are observed to form, the time is read and this time is the "string time." If the string falls within 125–225 seconds at about 170° C., the third step is completed.

Thereupon, the reaction product of ABCDE or ABCDF or ABCDEF has added to it from about 2 to about 25 parts and, preferably, 5 to about 10 parts of an aniline compound, and the total reaction mixture is then heated at a temperature between about 90° C. and 110° C. When the reaction of the 4th step is completed, the reaction product of ABCDEG or ABCDFG or ABCDEFG is cooled and a dehydrating step is accomplished so as to substantially completely dehydrate the reaction product. When dehydration has been completed, the resultant resinous material is diluted with an organic solvent.

In the first step, the pH is adjusted with a suitable acidic material such as sulfuric acid, nitric acid, hydrochloric acid, borontrifluoride, p-toluene sulfonic acid, and the like, until a pH between about 1 and 4 is reached. It is preferred to adjust the pH to between about 2.5 and 3.5. These same conditions will prevail for the second step.

At the beginning of the third step, the system is adjusted upwardly to a pH of about 6–7.5 and, preferably, between about 6.5–7.4 by the addition of such alkylene materials as hexamethyltetramine, ethylene diamine, triethylamine, propylenediamine, 3,3′-diamino-bis-propylene diamine, or the inorganic bases such as sodium, potassium, calcium, or ammonium hydroxide and the like. After step (3), no further adjustment of the pH is necessary.

Among the solvents that may be used to dilute the substantially completely dehydrated resinous reaction product are methyl ethyl ketone, dimethyl ketone, methylisobutyl ketone, alone, or in combination with toluene and/or isopropanol. Isopropanol, as well as methanol, ethanol, and butanol can be used to the exclusion of the aromatic solvents and the ketones. When the aromatic solvents are used, they should be used with one of the ketones or one of the monohydric alcohols. It is preferred to use a blend of toluene with one of the ketones and/or one of the $C_1$–$C_4$ alcohols. When such a blend is used, it is preferred to use a preponderant amount of the aliphatic reactant, such as 2:1 aliphatic to aromatic. Wherever the toluene may be used, benzene, xylene, and the like, may be used.

In step (1), one may use temperatures varying between about 25–110° C. and, preferably, between 70 and 90° C. at a period of time varying inversely between about 5 and 60 minutes and, preferably, between about 20 and 40 minutes. In the second step, the temperature is maintained between about 130 and 180° C. and preferably, between about 150° and 170° C. at periods of time varying inversely between about 30 and 240 minutes and, preferably, between about 90 and 180 minutes. In the third step, the temperature may be varied between about 70° C. and 120° C. and, preferably, between about 90° and 110° C. for periods of time varying inversely between 10 and 60 minutes and, preferably, between about 15 and 30 minutes. In the fourth step, the temperature may be varied between about 90 and 110° C. and, preferably, between 95 and 105° C. for periods of time varying inversely between about 2 and 15 minutes and, preferably, between about 5 and 10 minutes.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel equipped with heater, stirrer, reflux condenser and thermometer, there is introduced 46.4 parts of 99% phenol and 0.135 part of concentrated sulfuric acid. With constant agitation, the charge is heated to 80° C. Thereupon, 7.7 parts of monomeric styrene are charged to the reaction vessel over about a 30 minute period while holding the temperature at about 80° C.±5° C. The charge is then heated to 160° C. in approximately 30 minutes and 21.6 parts of tung oil are added. With constant agitation, the charge is reacted for about 3 hours at 160° C.±5° C. The reaction mass is then cooled to about 115°–120° C. and 1.07 parts of DPAPA [1] are added. The cooling is continued, and when a temperature of 90–95° C. is reached, 2.3 parts of hexamethyltetramine is added, followed by 6.9 parts of 91% paraformaldehyde with continued cooling. At 80° C., 21.96 parts of 45% aqueous solution of formaldehyde is added. The charge is heated to reflux and is refluxed for about 27 minutes. The sample was tested for its string time value at 15 minutes and again at 27 minutes. After 15 minutes, the sample had a string time ---
[1] Prepared by reacting 3 moles of the dimer of linolenic acid with 4 moles of ethylene diamine and the reaction product thus produced reacted with 2 moles of the pentanoic acid.

of 240–280 seconds, whereas at 27 minutes, the string time was about 150–190 seconds. Thereupon, 2.3 parts of aniline are added over a 5 minute period while continuing the refluxing for a total of 40 minutes, whereupon 0.25 part of a 1% solution in xylol of a commercially available anti-foam material is added. The steam jacket is then shut off and a light vacuum is applied so as to reflux the system gently. The condensation is allowed to flow into the receivers. The vacuum is increased as the temperature falls, while maintaining a gentle reflux until the temperature reaches about 75° C. at which point vacuum is about 17 inches of pressure, absolute. There is applied approximately 20 lbs. of steam on the jacket and the dehydration is continued at about 70–75° C. so as to remove by dehydration 14.8 parts of water. The system is cooled to about 60–65° C. with cooling water in the steam jacket, whereupon 15.8 parts of isopropanol and 7.9 parts of toluene are added. The cooling is continued and when a temperature of 50–55° C. is reached, 15.8 parts of methyl ethyl ketone are added. The system is vacuum refluxed gently until solution occurs whereupon the reaction mass in solution is cooled to room temperature is drummed off through a filter sock into lined drums.

The process outlined in the U.S. Pat. 3,044,895 is utilized to treat paper preparatory to making a laminate from core sheets and surface sheets. This patent is incorporated herein by reference. In the aforementioned patent, use is made of a water soluble resin and a water insoluble resin. The water soluble resin is prepared as follows:

Water soluble resin A.—Into a suitable reaction vessel equipped with thermometer, stirrer, reflux condenser and vacuum controller, there is introduced 5848 parts of a 45% aqueous solution of formaldehyde and 4850 parts of 99% phenol. While agitating the charge, 96.5 parts of triethylamine are introduced through a manhole while maintaining a light vacuum. The charge is then heated to reflux under vacuum at 70° C. in about 15–20 minutes. The vacuum reflux instrument is advanced to 75° C. and refluxing is continued at 75° C.±1° for 120+10 minutes. The charge is cooled to 30–35 C. and is drummed off. The specification of the resin thus produced is set forth hereinbelow:

ASTM solids—71.5–73.5%
Water tolerance—700–1200%
pH at 25° C.—7.9±0.1
Specific gravity—1.210±0.010
Viscosity (No. 2 spindle, 20 r.p.m.)—275±25 cps.
Gel time at 136° C.—10.5±1 minute Example 2

A resin treating composition is then prepared for use in treating the fillers or core sheets by blending 47 parts of the resin of Example 1 with 14 parts of the water soluble Resin A, 6 parts of antimony trioxide and 33 parts of a mixture of commercially available chlorinated bi- and tri-phenyls. The procedure of the above-cited patent is then followed wherein cotton linters paper sheets in both 12 and 20 mil thicknesses are prewetted with water and then impregnated with the resinous mixture referred to hereinabove to a final resin content on the paper of 58%±2.5% of resin based on the weight of paper and resin and the thus impregnated paper is dried to 5–18% flow. These papers are then prepared for use as the core sheets. A commercially available paper pre-treated to impart flame resistant properties thereto is impregnated with a mixture of 86 parts of the resin of Example 1 and 14 parts of the water soluble resin A to a resin content on the paper of 52%±2.5% and dried to 1%–10% flow. This provides the surface sheets. A 1/16″ laminate is assembled by using three sheets of 20 mil core sheets and one sheet of 12 mil core sheet in addition to two of the surface sheets. Separately, a 3/32″ laminate is prepared from five sheets of 20 mil core sheets and one core sheet of a 12 mil thickness and two surface sheets. The laminate is pressed at top temperatures of 160–168° C. and 1100 p.s.i. for 30 minutes. The properties of the final laminate are given hereinbelow in Table II. The test results are for a 1/16″ laminate except where otherwise indicated.

TABLE II

|  | | NEMA requirement | ASTM test method |
|---|---|---|---|
| Power factor, 10⁶ cycles, Cond. A | | .026 | .035 | D-150-59T |
| Power factor, 10⁶ cycles, Cond. 48/50 | | .029 | .050 | D-150-59T |
| Dielectric constant, 10⁶ cycles, Cond. A | | 4.49 | 4.60 | D-150-59T |
| Dielectric constant, 10⁶ cycles, Cond. 48/50 | | 4.83 | 5.30 | D-150-59T |
| Punching (room temperature): | | | | |
| 1/16 in | | 95 | | D-617-44 |
| 3/32 in | | 90 | | D-617-44 |
| Degreasing solvent resistance: | | | | |
| 1/16 in | | (¹) | | (²) |
| 3/32 in | | (¹) | | (²) |
| Flame retardance (seconds): | | | | |
| 1/16 in | | 4.3 | | D-635 |
| 3/32 in | | 7.0 | | D-635. |

¹ Excellent.
² A 1 x 3 x 1/8 inch laminate is exposed ten (10) minutes to trichloroethylene vapors, then observed for blisters which are an indication of trichloroethylene being absorbed by the laminate.

Example 3

The essential details of Example 2 are repeated except that in each instance the core sheets and the surface sheets are treated using a blend of 84 parts of the resin of Example 1 and 16 parts of the water soluble resin A only. Water prewetted paper in both 12 and 20 mil thicknesses are impregnated to 58±2.5% total resin and dried to 5–18% flow and are used for both filler and surface sheets. A 1/16″ laminate is assembled by using two sheets of 20 mil core sheets and one core sheet of 12 mil thickness with two 12 mil sheets used as surface sheets. The laminate is pressed at top temperatures of 160–168° C. and 1100 p.s.i. for 30 minutes. The properties of the final laminate are given in Table III.

TABLE III

Power factor, 10⁶ cycles:
  Cond. A _____ 0.0292
  Cond. 48/50 _____ 0.0336
Dielectric constant:
  Cond. A _____ 3.99
  Cond. 48/50 _____ 4.38
Punching (room temperature) _____ 90
Degreasing solvent resistance _____ Excellent Example 4

Example 1 is repeated again in all essential details except that the reactants are as follows: 100 parts of phenol, 50 parts of styrene, 70 parts of tung oil, 32 parts of a 45% aqueous solution of formaldehyde, 5 parts of hexamethylenetetramine, 28 parts of DPAPE, and 5 parts of aniline. The procedure of Example 1 is followed very closely. The DPAPE used in this example was prepared by reacting 3 moles of adipic acid with 4 moles of ethylene glycol, and the reaction product thus produced is reacted with 2 moles of the pentanoic acid.

Example 5

The procedure of Example 1 is again followed in all essential details except that there is used as the reactants 100 parts of phenol, 17 parts of styrene, 23 parts of tung oil, 32 parts of a 45% aqueous solution of formaldehyde, 5 parts of hexamethylene tetramine, 28 parts of the same DPAPE used in Example 4 and 10 parts of aniline.

Example 6

The process according to Example 2 is repeated in all essential details except that the resins of Examples 4 and 5 are used to prepare the laminate. The properties of the final laminates measuring 1/16" thick were determined by a plurality of tests which are shown in the Table IV hereinbelow:

TABLE IV

| System | Ex. 4 | Ex. 5 |
|---|---|---|
| Power factor, $10^6$ cycles: | | |
| Cond. A | .0284 | .0289 |
| D48/50 | .0319 | .0363 |
| Dielectric constant: | | |
| Cond. A | 3.903 | 4.365 |
| D48/50 | 4.397 | 4.816 |
| Punching (room temperature): | | |
| 1/16 in | 95 | 90 |
| 3/32 in | 90 | 85 |
| Degreasing solvent resistance: | | |
| 1/16 in | (1) | (1) |
| 3/32 in | (1) | (1) |

[1] Excellent.

The flow measurements recited in the Example 2 and following are determined by weighing 1⅝" diameter discs ($W_1$) and then pressed at 150° C. and 1100 p.s.i. for three minutes. The exuded resin is scraped off and the disc is weighed again ($W_2$). The percent of flow is calculated as follows:

$$\text{Percent flow} = \frac{(W_1 - W_2)}{W_1} \times 100$$

Example 7

Example 1 is repeated in all essential details except that the reactants and the amounts of reactants are as follows:

| | |
|---|---|
| Phenol | 100 |
| Styrene | 17 |
| Tung oil | 47 |
| Formaldehyde | 35 |
| Hexa | 5 |
| Aniline | 5 |
| Diphenolic acid (azelate) polyamide [1] | 23 |

[1] The diphenolic acid terminated polyamide used herein was prepared by reacting 3 moles of azelaic acid with 4 moles of ethylene diamine and the resulting reaction product was then reacted with 2 moles of 4,4'-bis-(4-hydroxyphenyl)pentanoic acid.

Example 8

Example 2 is repeated in all essential details except that the phenolic resin of Example 7 was used in the place of the resin of Example 1 in an amount of 47 parts with 14 parts of the water soluble Resin A, 6 parts of antimony trioxide and 33 parts of a mixture of commercially available chlorinated bi- and tri-phenyls. The laminates produced were tested for their various properties and the results are shown hereinbelow in Table V:

TABLE V

| | |
|---|---|
| Power factor, $10^6$ cycles: | |
| Cond. A | 0.0274 |
| D48/50 | 0.0307 |
| Dielectric constant, $10^6$ cycles: | |
| Cond. A | 4.50 |
| D48/50 | 4.88 |
| Punching (room temperature): | |
| 1/16" | 95 |
| 3/32" | 95 |
| Degreasing solvent ressitance: | |
| 1/16" | Excellent |
| 3/32" | Excellent |
| Flame retardance: | |
| 1/16" | 5.0 |
| 3/32 | 7.3 |

We claim:

1. A process which comprises:
   (1) reacting 100 parts of a phenol with about 5 to 60 parts of a polymerizable styrene monomer under acidic conditions at a temperature between about 25° C. and 110° C.;
   (2) reacting the product of step (1) with about 10 to 75 parts of a vegetable drying oil under acidic conditions at about 130° to about 180° C.;
   (3) cooling the reaction product of step (2) to a temperature below about 120° C., adjusting the pH to between about 6 and 7.5 while adding from about 15 to 50 parts of formaldehyde and from about 10 to 60 parts of a diphenolic compound selected from the group consisting of

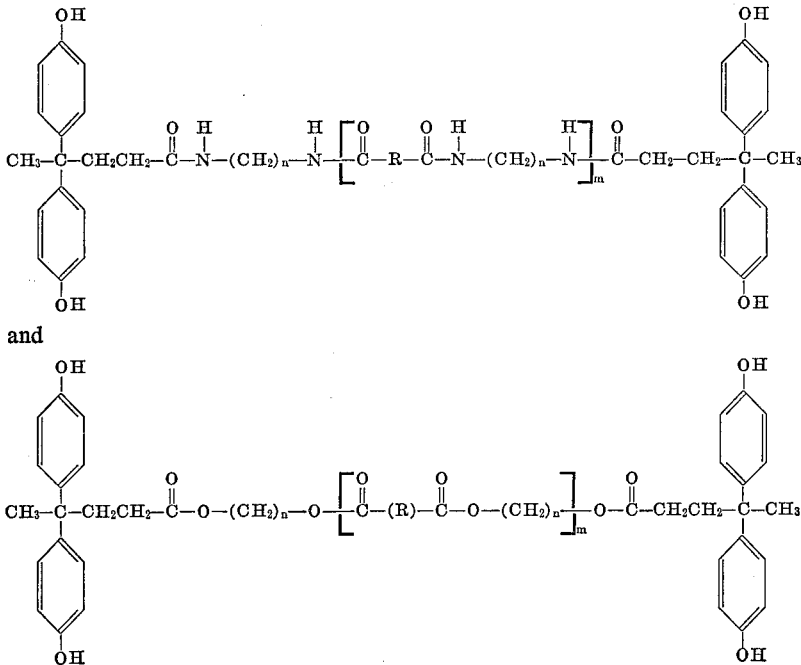

and wherein, in each of these structural formulae, R is a moiety of an aliphatic dicarboxylic acid having between 2 and 44 carbon atoms, wherein $n$ is a whole positive integer between 2 and 10, inclusive, and heat reacting said mixture at a temperature between about 70° C. and 120° C. to a string time of 125–225 sec. at 170° C.;

(4) adding to the reaction product of (3) from about 2 to about 25 parts of an aniline compound having at least one amino group, having at least one aldehyde reactive hydrogen atom attached directly to the nitrogen atom of said amino group, and heating the reaction mixture at a temperature between about 90° C. and 110° C.;

(5) cooling the reaction product;

(6) substantially completely dehydrating the reaction product and (7) diluting with an organic solvent.

2. The product produced according to the process of claim 1.

3. The process according to claim 1 in which the phenol is phenol per se, the styrene is styrene per se, the vegetable drying oil is tung oil, the diphenolic compound is the reaction product of 4 moles of ethylene diamine with three moles of the dimer of linolenic acid reacted with two moles of 4,4'-bis-(4-hydroxyphenyl)pentanoic acid and the aniline compound is aniline per se.

4. The process according to claim 1 in which the phenol is phenol per se, the styrene is styrene per se, the vegetable drying oil is tung oil, the diphenolic compound is the reaction product of 4 moles of ethylene glycol with three moles of adipic acid reacted with two moles of 4,4'-bis-(4-hydroxyphenyl)pentanoic acid and the aniline compound is aniline per se.

5. The process according to claim 1 in which the phenol is phenol per se, the styrene is styrene per se, the vegetable drying oil is tung oil, the diphenolic compound is the reaction product of four moles of ethylene glycol with three moles of the dimer of linolenic acid reacted with two moles of 4,4'-bis-(4-hydroxyphenyl)pentanoic acid and the aniline compound is aniline per se.

6. The product produced according to the process of claim 3.

7. The product produced according to the process of claim 4.

8. The product produced according to the process of claim 5.

9. The process according to claim 1 in which the phenol is phenol per se, the styrene is styrene per se, the vegetable drying oil is tung oil, the diphenolic compound is the reaction product of four moles of ethylene diamine with three moles of the dimer of linoleic acid reacted with two moles of 4,4'-bis-(4-hydroxyphenyl)pentanoic acid and the aniline compound is aniline per se.

10. The product produced according to the process of claim 9.

References Cited
UNITED STATES PATENTS 3,228,899   1/1966   Elmer et al. ---------- 260—19

WILLIAM H. SHORT, Primary Examiner

H. SCHAIN, Assistant Examiner

U.S. Cl. X.R.

117—60, 155, 161; 156—335; 161—264

UNITED STATES PATENT OFFICE
CERTIFICATE OF CORRECTION

Patent No. 3,573,238            Dated March 30, 1971

Inventor(s) Donald Joseph Albrinck, Victor Said Asfour

It is certified that error appears in the above-identified patent and that said Letters Patent are hereby corrected as shown below:

Column 2, Lines 20, 21

"ploymerizable"      should be polymerizable

Column 3 next to last line of formula –

"CH"      should be $CH_3$

Column 4 next to last line of formula –

$"\overset{O}{\underset{O}{\overset{\|}{\|}}} - CH_2CH_2"$      should be $\overset{O}{\underset{C}{\|}} - CH_2CH_2$ Signed and sealed this 10th day of August 1971.

(SEAL)
Attest:

EDWARD M. FLETCHER, JR.         WILLIAM E. SCHUYLER, JR.
Attesting Officer               Commissioner of Patents